US011353039B2

(12) United States Patent
Knowles et al.

(10) Patent No.: US 11,353,039 B2
(45) Date of Patent: Jun. 7, 2022

(54) SYSTEM AND METHOD FOR HANDLING DIGITAL CONTENT GOVERNANCE IN AN ORGANIZATION

(71) Applicant: Alfresco Software, Inc., San Mateo, CA (US)

(72) Inventors: John Knowles, Slough (GB); John Iball, Bicester (GB); Ovidiu Benea, Isai (RO); Stefania Ropotica, Isai (RO)

(73) Assignee: HYLAND UK OPERATIONS LIMITED, Maidenhead (GB)

( * ) Notice: Subject to any disclaimer, the term of this patent is extended or adjusted under 35 U.S.C. 154(b) by 469 days.

(21) Appl. No.: 16/121,404

(22) Filed: Sep. 4, 2018

(65) Prior Publication Data
US 2020/0072234 A1   Mar. 5, 2020

(51) Int. Cl.
| | | |
|---|---|---|
| *G06F 16/30* | (2019.01) | |
| *F04D 29/38* | (2006.01) | |
| *G06F 21/10* | (2013.01) | |
| *G06F 16/93* | (2019.01) | |
| *G06F 16/35* | (2019.01) | |
| *G06Q 50/18* | (2012.01) | |

(52) U.S. Cl.
CPC ......... *F04D 29/382* (2013.01); *F04D 29/388* (2013.01); *G06F 16/353* (2019.01); *G06F 16/93* (2019.01); *G06F 21/10* (2013.01); *F05D 2240/303* (2013.01); *F05D 2240/304* (2013.01); *G06Q 50/184* (2013.01); *H04L 2209/60* (2013.01)

(58) Field of Classification Search
CPC .............................. G06F 16/353; G06F 16/93
USPC ........ 707/609, 687, 705, 769, 790, 813, 821
See application file for complete search history.

(56) References Cited

U.S. PATENT DOCUMENTS

| | | | |
|---|---|---|---|
| 8,554,772 B2 | 10/2013 | Ayars et al. | |
| 8,583,651 B2 | 11/2013 | Ayars et al. | |
| 9,203,862 B1* | 12/2015 | Kashyap | G06F 11/1405 |
| 10,257,109 B2* | 4/2019 | Velasco | G06F 17/3089 |
| 2010/0186091 A1* | 7/2010 | Turner | G06F 21/604 726/26 |
| 2011/0218995 A1* | 9/2011 | Ayars | G06F 16/00 707/737 |
| 2012/0191711 A1 | 7/2012 | Ayars et al. | |
| 2015/0278323 A1 | 10/2015 | Melahn et al. | |
| 2016/0110370 A1 | 4/2016 | Wetherall et al. | |
| 2017/0364698 A1* | 12/2017 | Goldfarb | H04L 9/3239 |

* cited by examiner

*Primary Examiner* — Sana A Al-Hashemi
(74) *Attorney, Agent, or Firm* — Mintz Levin Cohn Ferris Glovsky and Popeo, P.C.; F. Jason Far-hadian, Esq.

(57) ABSTRACT

A system and method for records management and classification of files in a content management system having a server system that stores the files. A system detects when at least one of the files is classified by a user of a client computing system as a classified file, and based on the detecting of the classification of the one or more files, each classified file is removed from the client computing system. The system further detects when at least one of the files is declared as a permanent record by the user of the client computing system, and based on the detecting of the declaration as a permanent record, prevents editing by the client computing system of each file declared as a permanent record.

17 Claims, 3 Drawing Sheets

Desktop Sync Overview

File Declared as Record

SYSTEM AND METHOD FOR HANDLING DIGITAL CONTENT GOVERNANCE IN AN ORGANIZATION

TECHNICAL FIELD

The subject matter described herein relates to content management systems and methods, and more particularly to a record and classified file management system and method for handling content governance throughout an organization.

BACKGROUND

Enterprise content management (ECM) covers a broad range of applications, including document management (DM), Web content management (WCM), records management (RM), digital asset management (DAM), search of managed content, and the like. A content management system (CMS) suitable for managing the various content items that an enterprise produces or generates, retains or otherwise stores, manipulates or modifies, etc. can support the requirements of one or more of such applications, and optionally other requirements, to provide a coherent solution in which content and management processes are capable of accessing content across a variety of applications subject to access controls, permissions, and the like. An "enterprise" can generally refer to an organization, such as for example a business or company, a governmental entity, a foundation, a university, or the like, and can have content requirements related to one or more business processes, content uses, etc.

End users, often government personnel, will create content on their client computing system, such as a desktop or laptop computer, which is to be declared as a permanent record and/or classified due to the sensitive nature of its contents.

Electronic ECM with records and classified files is typically done on a remote server, which users have to login to remotely to perform specific actions like declaring a file as a record, and classifying a file, etc. Records management and classification is normally done via a server-based application therefore requiring users to adhere to manual processes and procedures to move sensitive materials from their computers to the remote server.

SUMMARY

This document describes a system and method, implemented as a native or downloadable desktop application, which allows content to be treated appropriately when users have synchronized files from a centralized, controlled content management system to their desktops. The system and method provides content governance record declaration and classification capabilities from within the native operating systems of users's computers, namely Windows® and Mac OS X®.

In some aspects of the system and method disclosed herein is the removal of files from users' computers when they are classified, and preventing editing of files that have been declared as permanent records.

In one aspect, a user is able to work with files locally, on their desktop using the downloadable application, for instance, while each file is automatically synchronized to the electronic content management system, and treated automatically during specific points in the lifecycle of the content.

In some aspects, a system, method and computer program product include a computer-implemented process for records management and classification of files in a content management system having a server system that stores the files. The method includes steps o detecting, by an application, when at least one of the files is classified by a user as a classified file, and based on the detecting of the classification of the one or more files, removing, by the application, each classified file from the client computing system. The process further includes detecting, by the application, when at least one of the files is declared as a permanent record by the user, and based on the detecting of the declaration as a permanent record, preventing, by the application, editing by the client computing system of each file declared as a permanent record.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
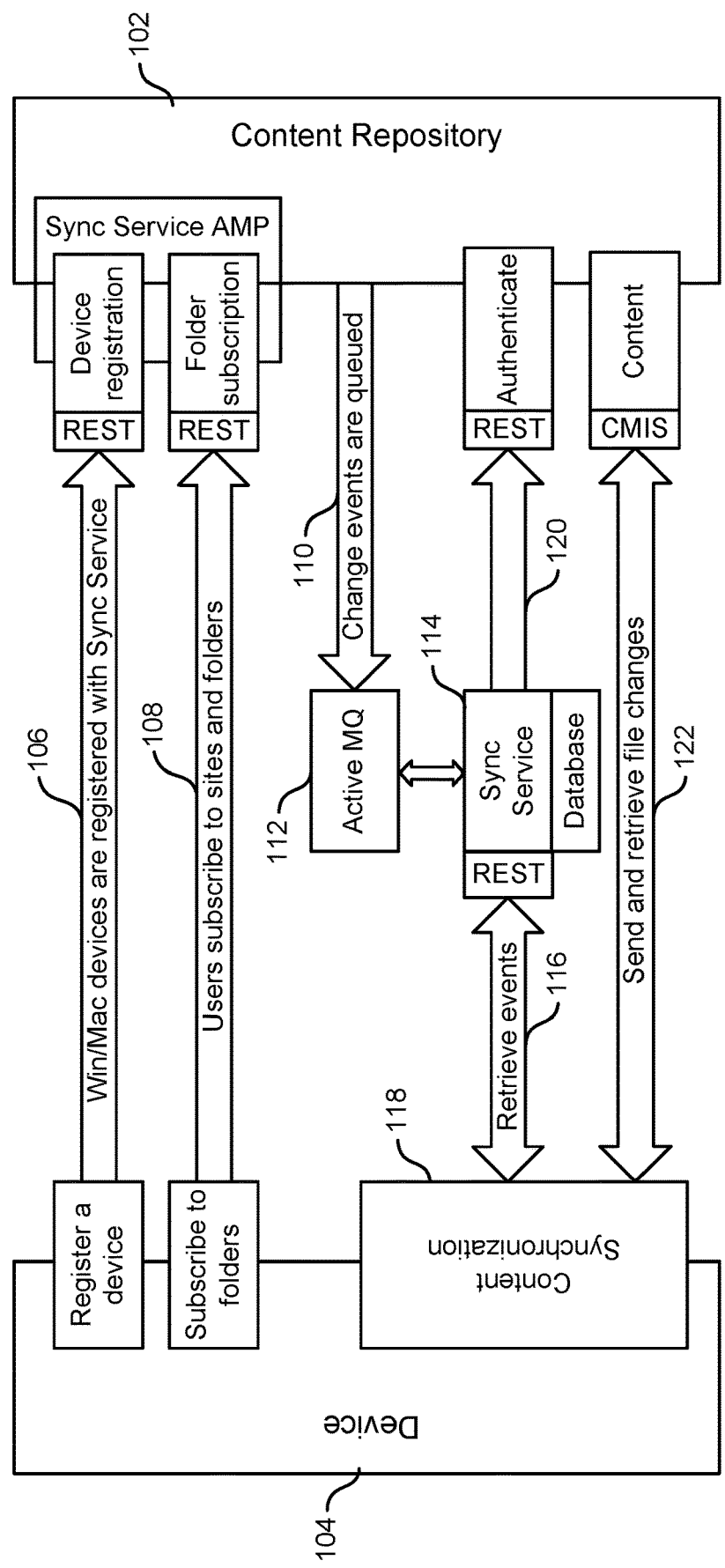
FIG. 1 illustrates a desktop synchronization process at a high level.

A system and method is described, which can be implemented as a native or downloadable desktop application. The system and method, as executed by a computer system, allows content to be treated appropriately when users have synchronized files from a centralized, controlled content management system to their desktops. The system and method provides content governance, record declaration, and classification capabilities from within the native operating systems of users' computers.

Check Out/In of Files

In order to collaborate on files stored in a content management system, users can "check out" one or more files, which locks the file out so that other users cannot edit a separate copy. Through integration into a client computer's operation system, such as Windows Explorer® and Mac Finder®, users can check files out for editing directly from their computer. Meanwhile, the checked-out files are automatically locked on the server to other users. Where a checked-out file is synchronized to another users computer, it is put into a read-only state to prevent editing. Users receive notifications directly on their computer whenever a synchronized file is checked out or in by another user.

Permissions Synchronization

Organizations apply varying levels of user permissions to files and folders in a centralized content management system. Permissions can range from no access, to view-only, and up to full edit and delete. It is critical for organizational content to be managed in accordance with those permissions even when outside of the centralized system, which includes a content repository.

In accordance with the methods and systems described herein, users cannot: synchronize files or folders without view permission; edit synchronized files/folders without edit permissions; nor delete synchronized files/folders without delete permissions. In the system, clients replicate the permissions set in the centralized content management system on the synchronized files by utilizing the computers' operating systems' (Windows or Mac OS X) Access Control Lists (ACLs) APIs. The files are monitored, and attempts to override are automatically reversed, even when the user has administrator control of the computer. Where a users' permissions are changed in the centralized content management system, then the clients will receive an event for the specific changes, and update the files/folders on the users' machine in accordance with the changes made on the server.

The system provides efficiency, where the correct treatment of content that is to be a record or classified is critical to ensure legal requirements are adhered to. The process can be burdensome to end users and can be fraught with complexity where content is originated on users' computers. Integrating the desktop with the automation of an electronic content management system saves significant time and reduces the manual effort required.

Governance and Compliance: By taking records management and classification controls to where users are creating content, records managers and information/compliance officers are better able to control live content that users have on their computers.

User Adoption: User adoption of Records Management solutions (though this does not only apply to records but general content) is critical in a successful deployment. The ability to control files that are on users' desktops significantly increases the reach of these governance controls in organizations. The solution can be implemented into a government or commercial organization that generates and manages both permanent records and classified content.

Figure 2:
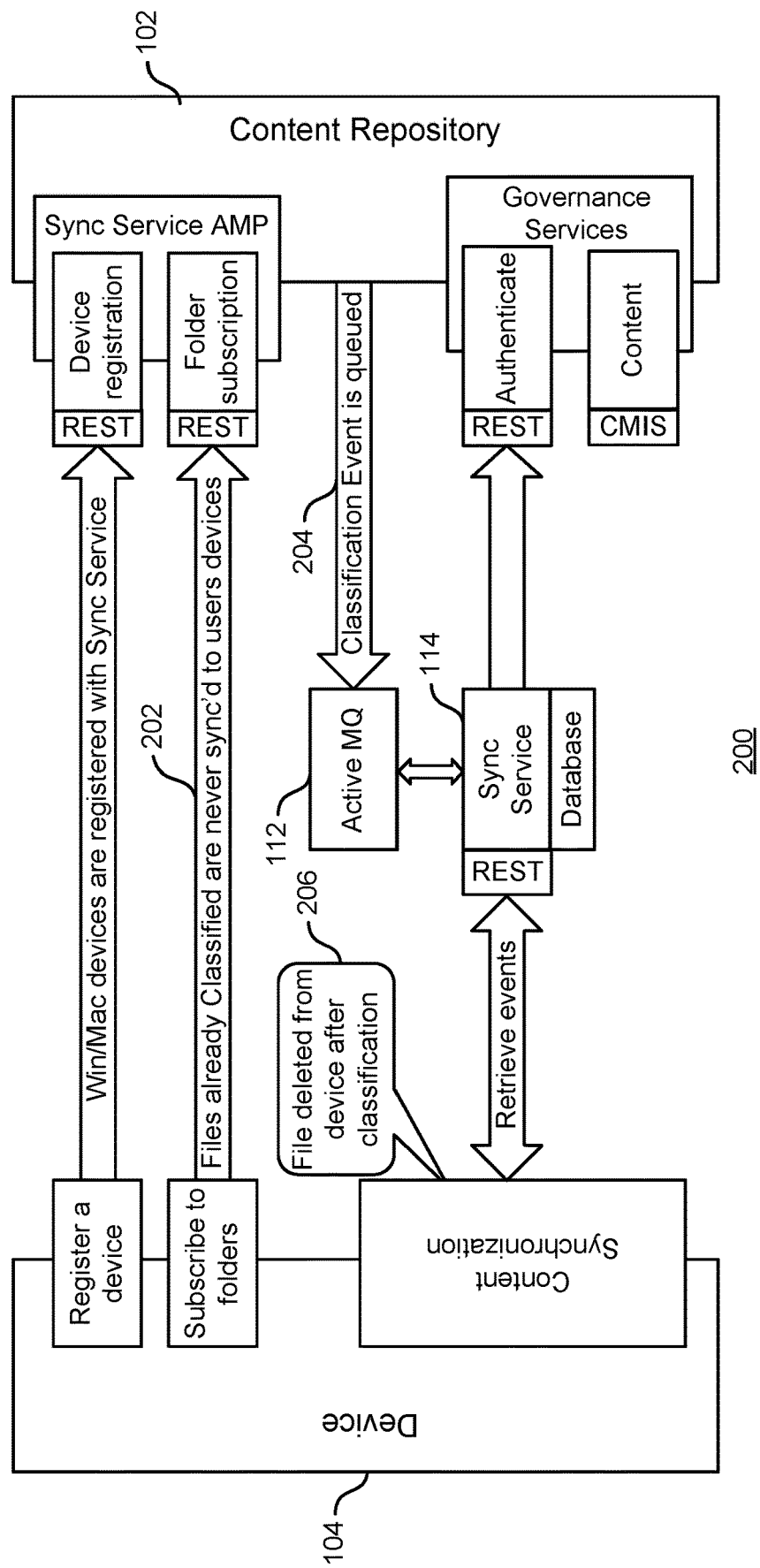
FIG. 2 illustrates the desktop synchronization process when files are classified.
Figure 3:
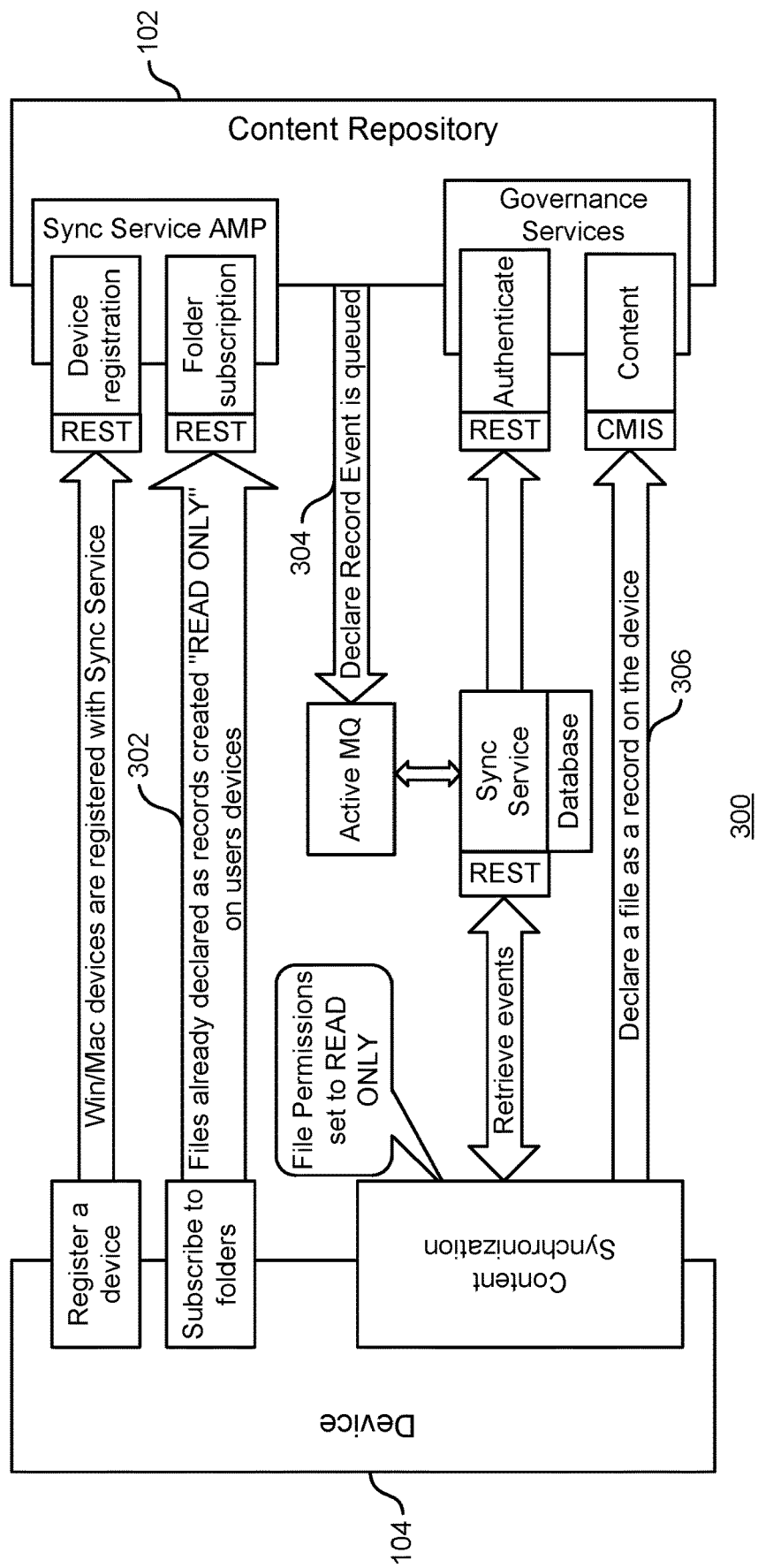
FIG. 3 illustrates the desktop synchronization process when files are declared as records.

FIGS. 1-3 illustrate a system executing a process for desktop synchronization, consistent with implementations of the current subject matter. FIG. 1 illustrates a desktop synchronization process, as substantially described in U.S. Patent Publication No. 2015/0278323, entitled "SYNCHRONIZATION OF CLIENT MACHINES WITH A CONTENT MANAGEMENT SYSTEM REPOSITORY," the contents of which are incorporated by reference herein for all purposes.

FIG. 1 illustrates the various stages and processes that occur during a normal content synchronization from a centralized content management system 102 (which includes a content repository) to a user's client computing system 104. The client computing system 104 can include a computing device, such as a desktop computer, laptop computer, tablet computer, mobile computing device, or the like, and which includes client software applications configured for creating, editing, managing records. After installing the client software, the user's computing device is registered with the system, at 106. Following the computing device registration, the user can select which folders are to be synchronized to their computing device, at 108.

As shown in FIG. 1, at 110 all content events (create, update, delete, rename etc.) are generated by the centralized content management system, placed into a queue 112 and processed by a synchronization service 114. At 116, the end-user client computing system retrieves events relevant to their subscribed content, the events contain necessary information so that the client computing system can perform a synchronize operation 118 (download, rename, delete, etc.). In the case that a local change to content is made on the users' computer, then the application makes appropriate changes to the server directly, at 120. File changes can be sent and retrieved between the content management system 102 and the client computing system 104, at 122.

FIG. 2 illustrates a desktop synchronization process 200 when files are classified, in accordance with implementations described herein. Arrow 202 shows that pre-existing classified files are not synchronized to users' computing devices, and arrow 204 shows that when an event is generated after a file is classified, that event is queued for retrieval by any users who are synchronizing the content. At step 206, the file is deleted from the client computing system 104.

In yet other implementations, the desktop synchronization process 200 can allow different treatment of classified files based on a classification applied to a specific file. For instance, a file classified as "SECRET" can be synchronized between a server system and selected ones of the client computing systems 104 or devices, while a file classified as "TOP SECRET" can be deleted from the client computing systems 104. Accordingly, where different classifications of files are used, the system and method provided herein can provide different corresponding treatment and handling of those files, and based on a particular classification.

FIG. 3 illustrates a desktop synchronization process 300 when files are declared as records. Arrow 302 shows that when an event is generated after a file is declared, an event is queued for retrieval by any users of client computing systems 104 who are synchronizing the content. As a result, the file is made read-only, and cannot be changed. Arrow 304 indicates that the desktop synchronization client can also trigger the record declaration directly on the server 102, after which a declared record event is generated for other users who may be synchronizing the file, at 306.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for records management and classification of files in a content management system having a server system that stores the files, the method comprising:
   detecting, by an application, when at least one of the files is classified by a user as a classified file;
   based on the detecting of the classification of the one or more files, removing, by the application, the classified file from a client computing system;
   detecting, by the application, when at least one of the files is declared as a permanent record by the user; and
   based on the detecting of the declaration as a permanent record, preventing, by the application, editing by the client computing system of each file declared as a permanent record,
   wherein detecting the classification of the one or more files is in response to a synchronization process between the client computing system and a remote server system, different classifications providing for different treatment of classified files based on a classification applied to a specific file.

2. A computer program product for records management and classification of files in a content management system having a server system that stores the files and is configured for registering a client computing system with a synchronization service of the content management system, the computer program product comprising a non-transitory machine-readable medium storing instructions that, when executed by at least one programmable processor, cause the at least one programmable processor to perform operations comprising:
   detecting when one or more files stored on the content management system or the client computing system are classified;
   in response to a synchronization event to synchronize files stored on the content management system with the client computing system, removing one or more classified files from the client computing system that correspond to a first classification, but maintaining copies of the one or more files removed from the client computing system on the content management system; and in response to detecting that at least one of the one or more files is declared as a permanent record, preventing editing of the at least one file declared as a permanent record by a user of the client computing system.

3. A computer-implemented system comprising one or more processors and computing instructions that when executed by the one or more processors causes the computer-implemented system to:

monitor one or more files stored on a first computing system responsive to one or more classification events;

in response to determining a first file from among the one or more files is classified according to a first classification, remove a copy of the first file stored on a second computer from the second computer, the second computer being synchronized with the first computer based on a selection of folders to be synchronized between the first computer and the second computer, the folders containing the one or more files;

in response to determining a second file from among the one or more files is classified according to a second classification, prevent editing of a copy of the second file stored on the second computer.

4. The method in accordance with claim 1, wherein the classification of the one or more files is done by the application on the client computing system remotely from the content management system.

5. The method in accordance with claim 1, wherein the declaration of the one or more files as a permanent record is done by the application on the client computing system remotely from the content management system.

6. The method in accordance with claim 1, wherein the one or more files declared as a permanent record are queued by the server system for delivery to the client computing system.

7. The method in accordance with claim 1, wherein the declaration of at least file as a permanent record is made via an application being executed on a client computing system.

8. The method in accordance with claim 1, wherein the server system is a cloud-based server system.

9. The method of claim 1, wherein the removing of the classified file from the client computing system comprises removing a first classified file, in response to determining the first classified file is classified according to a first classification.

10. The computer program product in accordance with claim 2, wherein the classification of the one or more files is done by an application on the client computing system remotely connected to the content management system.

11. The computer program product in accordance with claim 2, wherein declaring the at least one file as a permanent record is done by an application on the client computing system remotely connected to the content management system.

12. The computer program product in accordance with claim 2, wherein one or more files declared as a permanent record are queued by the server system for delivery to the client computing system.

13. The computer program product in accordance with claim 2, wherein the declaring of a file as a permanent record is made via an application being executed on the client computing system.

14. The computer-implemented system of claim 3, wherein the first classification is an indication that the first file and the copy of the first file include content associated with restricted access to prevent a user of the second computing system from viewing the content of the first file or the copy of the first file.

15. The computer-implemented system of claim 3, wherein the second classification is an indication that the second file and the copy of the second file are associated with restricted edit permissions to prevent a user of the second computing system from editing either the second file or a copy of the second file.

16. The method of claim 9, wherein a second classified file is not removed from the client computing system, in response to determining the second classified file is classified according to a second classification.

17. The method of claim 16, wherein the first classification is TOP SECRET and the second classification is SECRET.

* * * * *